US008929111B2

(12) United States Patent
White

(10) Patent No.: US 8,929,111 B2
(45) Date of Patent: Jan. 6, 2015

(54) SYSTEM AND METHOD FOR COMMON-MODE ELIMINATION IN A MULTI-LEVEL CONVERTER

(71) Applicant: Hamilton Sundstrand Corporation, Windsor Locks, CT (US)

(72) Inventor: Adam Michael White, Belvidere, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 291 days.

(21) Appl. No.: 13/656,880

(22) Filed: Oct. 22, 2012

(65) Prior Publication Data

US 2014/0112040 A1    Apr. 24, 2014

(51) Int. Cl.
*H02M 7/515* (2007.01)
(52) U.S. Cl.
USPC .............................. 363/123; 363/131; 363/98
(58) Field of Classification Search
USPC ........... 363/16–17, 34, 35, 37, 39, 41, 43, 44, 363/49, 56.02, 89, 93, 95–98, 123–127, 363/131–132; 318/139, 373, 100.06, 802, 318/805–806, 811
See application file for complete search history.

(56) References Cited

U.S. PATENT DOCUMENTS

| | | | |
|---|---|---|---|
| 6,154,379 A * | 11/2000 | Okita | 363/40 |
| 6,751,105 B2 * | 6/2004 | Yamanaka et al. | 363/41 |
| 6,850,426 B2 * | 2/2005 | Kojori et al. | 363/123 |
| 7,250,740 B2 * | 7/2007 | Katsuki et al. | 318/400.13 |
| 2003/0107342 A1 * | 6/2003 | Gallegos-Lopez | 318/701 |
| 2011/0074489 A1 * | 3/2011 | Viitanen et al. | 327/427 |
| 2012/0249021 A1 * | 10/2012 | Hamanaka et al. | 318/139 |
| 2013/0147416 A1 * | 6/2013 | Khalil et al. | 318/701 |
| 2013/0279216 A1 * | 10/2013 | Nguyen et al. | 363/41 |

* cited by examiner

*Primary Examiner* — Adolf Berhane
*Assistant Examiner* — Nusrat Quddus
(74) *Attorney, Agent, or Firm* — Kinney & Lange, P.A.

(57) ABSTRACT

A multi-level converter includes a plurality of alternating current (AC) terminals connected to an AC source or load, at least three direct current (DC) terminals connected to a multi-level DC source or load, and a plurality of solid-state switches that are selectively turned On and Off to connect each of the plurality of AC terminals to one of the DC terminals. A controller provides PWM control signals to the solid-state switches. The controller utilizes space vector modulation to organize the various switching state configurations, and increments the switching states during a first half of the switching period and decrements the switching states during a second half of the switching period to center-align the PWM signals provided about the center of the switching period. The switching states utilized during the switching period dictate the PWM control signals provided to the plurality of switches employed in the three-level converter.

15 Claims, 5 Drawing Sheets

_US 8,929,111 B2_

SYSTEM AND METHOD FOR COMMON-MODE ELIMINATION IN A MULTI-LEVEL CONVERTER

BACKGROUND

The present invention is related to multi-level converters, and in particular to controllers for multi-level converters.

Multi-level converters, such as three-level converters, are oftentimes used to convert an alternating current (AC) voltage into a direct current (DC) voltage, or to convert a direct current (DC) voltage into an alternating current (AC) voltage. A three-level converter is different from a typical converter because switches of the three-level converter are provided in separate levels to provide an electrical connection between an AC terminal and either a positive DC terminal, a negative DC terminal, or a midpoint or neutral-clamped terminal.

Ideally, the switches are controlled to provide the desired voltages at each of the AC terminals of the converter, and there will be no common mode voltage at the AC terminals of the converter. There is no common mode voltage at the AC terminals of the converter only if the sum of all AC terminal voltages to ground is zero. Previously, controllers used to control the state of the plurality of switches associated with the three-level converter have utilized space vector modulation to prevent the generation of common mode voltage at the AC terminals of the three-level converter.

SUMMARY

A multi-level converter includes a plurality of alternating current (AC) terminals, at least three direct current (DC) terminals, and a plurality of solid-state switches that are selectively turned On and Off to connect each of the plurality of AC terminals to one of the DC terminals. The converter also includes a controller that monitors commanded AC voltages and provides pulse-width modulation (PWM) control signals to the plurality of solid-state switches to selectively control the On/Off state of the solid-state switches. The space vector controller organizes the various switching state configurations of the solid-state switches into a plurality of triangular regions, wherein the controller selects one of the plurality of triangular regions based on the commanded voltage vector and selects an origin switching state within the triangular region, wherein the controller increments the switching state in a first direction around the triangular region during a first half-cycle of a switching period and decrements the switching state in a second direction around the triangular region during a second half-cycle of the switching period.

DETAILED DESCRIPTION

The present invention provides a system and method of generating pulse-width modulated (PWM) patterns for a multi-level converter that produce no common mode voltage at the AC converter terminals and are center-aligned to prevent distortion introduced into the line-to-neutral voltages. In particular, the present invention switches one phase of the converter at twice the frequency of the other two phases for a portion of the AC voltage fundamental period. The present invention is applicable to converters used to convert a DC input to an AC output (commonly referred to as an inverter) as well as to converters used to convert an AC input to a DC output (commonly referred to as rectifiers). In both embodiments, the controller receives AC voltage commands that represent the desired AC voltage to be provided at the AC terminals of the converter. For purposes of this discussion, the three-level converter is described with respect to the inverter embodiment in which the AC terminals are connected to an AC load and the DC terminals are connected to a DC source. In the rectifier embodiment though, the DC terminals may be connected to a DC load and the AC terminals may be connected to an AC source via an AC side impedance. By controlling the AC power converter terminal voltage, the power flow from the AC source through the AC side impedance is controlled, and the DC link voltage can be regulated by controlling this power flow.

Figure 1:
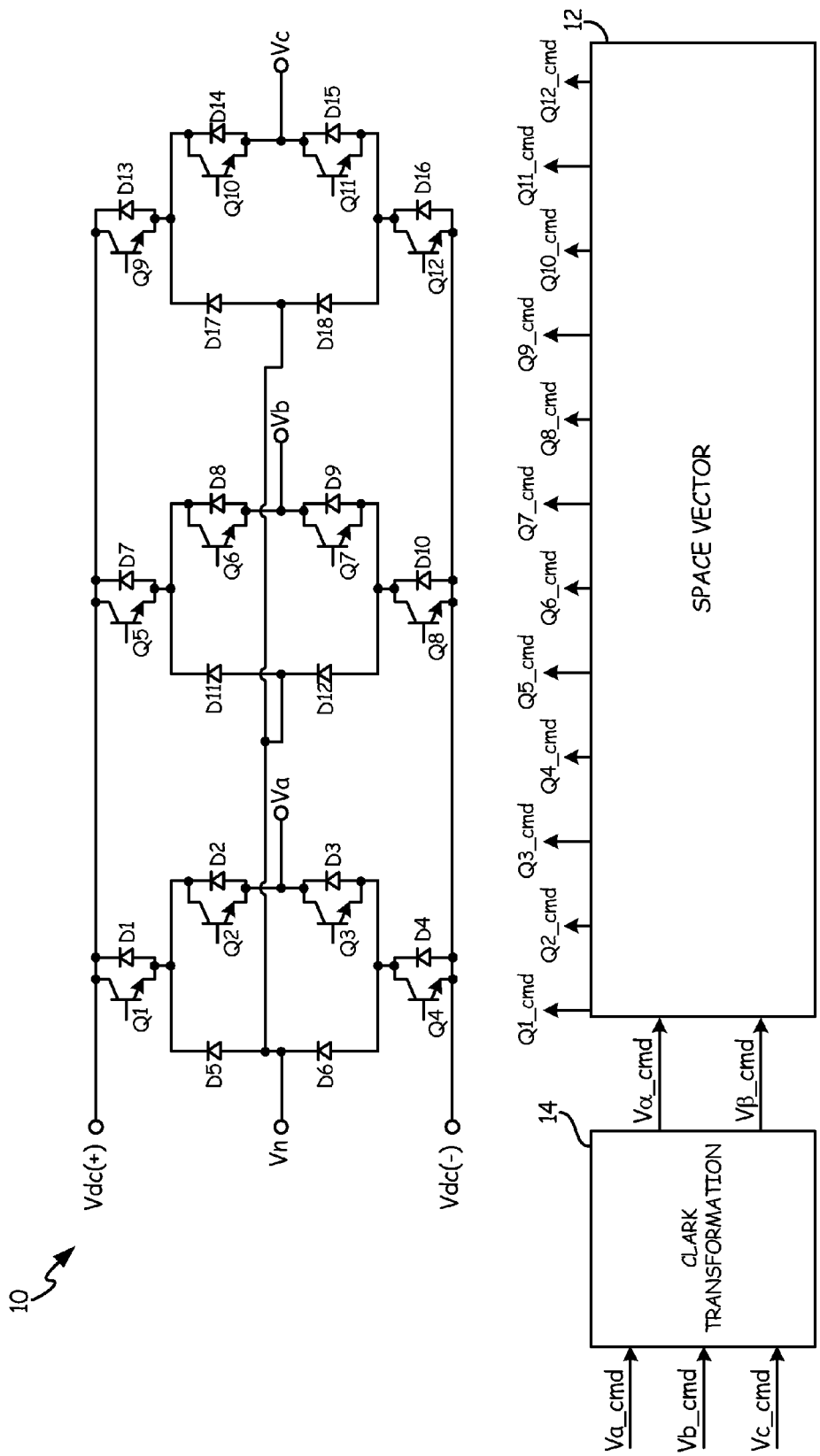
FIG. 1 is a circuit diagram of a three-level converter according to an embodiment of the invention.

FIG. 1 is circuit diagram of three-level converter 10 according to an embodiment of the invention. Three-level converter 10 includes three-phase alternating current (AC) terminals Va, Vb, and Vc, and direct current terminals Vdc(+), Vn, Vdc(−), a plurality of diodes D1-D18, solid-state switches Q1-Q12, controller 12 and Clark transformation block 14.

Voltage commands Va_cmd, Vb_cmd, and Vc_cmd represent the desired or commanded AC output voltages Va, Vb, and Vc to be generated by three-level converter 10. Clark transformation 14 receives the voltage commands Va_cmd, Vb_cmd, and Vc_cmd and converts these commands from the three-phase abc reference frame to the two-phase $\alpha\beta$ reference frame represented as voltage commands $V\alpha$_cmd and $V\beta$_cmd for provision to controller 12. In response to the voltage command signals $V\alpha$_cmd and $V\beta$_cmd, controller 12 generates a plurality of pulse width modulation (PWM) signals (labeled 'Q1_cmd'-'Q12_cmd') for provision to each of the plurality of solid-state switches Q1-Q12, respectively, to selectively control the state (e.g., On/Off) of the switches. To achieve this, controller 12 selectively connects each of the plurality of AC terminals Va, Vb, and Vc to one of the plurality of DC terminals Vdc(+), Vn, and Vdc(−). For example, AC terminal Va is connected to DC terminal Vdc(+), Vn, and Vdc(−) via solid-state switches Q1-Q4. Controller 12 can selectively connect AC terminal Va to DC terminal Vdc(+) by turning On solid-state switches Q1 and Q2. Likewise, controller 12 can selectively connect AC terminal Va to Vn by turning On solid-state switches Q2 and Q3, and can selectively connect AC terminal Va to Vdc(−) by turning On solid-state switches Q3 and Q4. Controller 12 similarly controls switches Q5-Q12 to selectively connect AC terminals Vb and Vc to DC terminals Vdc(+), Vn, and Vdc(−). In this way, controller 12 can regulate the plurality of AC terminal voltages Va, Vb, and Vc to commanded AC terminal voltages.

Ideally, controller 12 controls the plurality of switches Q1-Q12 to provide desired AC voltages at terminals Va, Vb, and Vc. As described in more detail with respect to FIGS. 2-4, controller 12 utilizes space vector modulation (SVM) to generate the pulse-width modulated (PWM) switching pattern used to control the state (e.g., On/Off) of the plurality of solid-state switches Q1-Q12. In general, the PWM switching pattern turns selective switches On and Off once per cycle (i.e., duration of a switching period) to connect an AC terminal to either the positive DC terminal Vdc(+), the neutral (or mid-point) DC terminal Vn, or the negative DC terminal Vdc(−). However, in the present invention, controller 12 operates to turn On one of the switches twice each switching cycle to ensure that the PWM signals are center-aligned within the switching period (i.e., On times associated with each switch are balanced about the center of the switching period). Center-aligning the PWM signals has the benefit of preventing distortion in the AC line-to-neutral output voltages.

Figure 2:
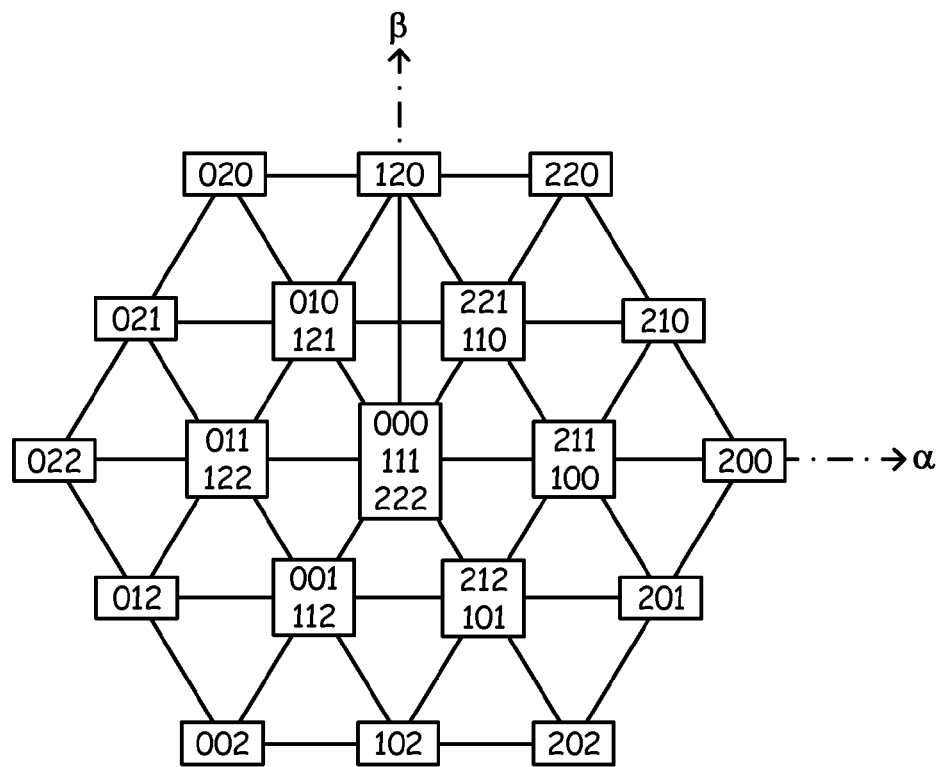
FIG. 2 is a space vector diagram that illustrates the plurality of switch states available to a three-level converter according to an embodiment of the present invention.

FIG. 2 is a space vector diagram illustrating the plurality of switching states available to a three-level converter according to an embodiment of the present invention. In general, space vector modulation (SVM) provides a framework employed by controller 12 to generate the PWM switching patterns for the plurality of solid-state switches Q1-Q12. The location of each state in the α-β reference frame describes the resulting voltage generated when switches are placed in those states. The commanded AC voltage is represented in the αβ reference frame as a voltage vector V*, wherein V*=Vα_cmd+ jVβ_cmd. The plurality of switching states form a plurality of triangular regions, the number of which depends on how many levels are associated with the converter. Based on the location of the voltage vector V* within one of the triangular regions, controller 12 selects those three states defining the triangular region, and selectively alters the duty cycle (e.g., time spent at each state) to generate the desired AC terminal voltage represented by the vector.

Each state is represented by a three-digit number that describes the connection of each of the plurality of AC terminals (in this case, three) to one of the plurality of DC terminals. The number '0' indicates that the respective AC terminal is connected to the negative DC terminal Vdc(−). The number '1' indicates that the respective AC terminal is connected to the neutral or mid-point DC terminal Vn. The number '2' indicates that the respective AC terminal is connected to the positive DC terminal Vdc(+). The state '210' therefore indicates that AC terminal Va is connected to the positive DC terminal Vdc(+), AC terminal Vb is connected to neutral DC terminal Vn, and AC terminal Vc is connected to negative DC terminal Vdc(−). If controller 12 selects state '210', solid-state switches Q1 and Q2 would be turned On to connect the AC terminal Va to the positive DC terminal Vdc(+), solid-state switches Q6 and Q7 would be turned On to connect the AC terminal Vb to the neutral DC terminal Vn, and solid-state switches Q11 and Q12 would be turned On to connect the AC terminal Vc to the negative DC terminal Vdc(−).

A benefit of space vector modulation is that it provides a simplified method of creating the PWM switching patterns for the plurality of solid-state devices Q1-Q12. The location of the vector in the triangular region defined by three switching state dictates the switching states utilized by controller 12. In particular, controller 12 controls the time or duty cycle associated with each switching state in order to regulate the AC terminal voltages to a desired magnitude.

Figure 3:
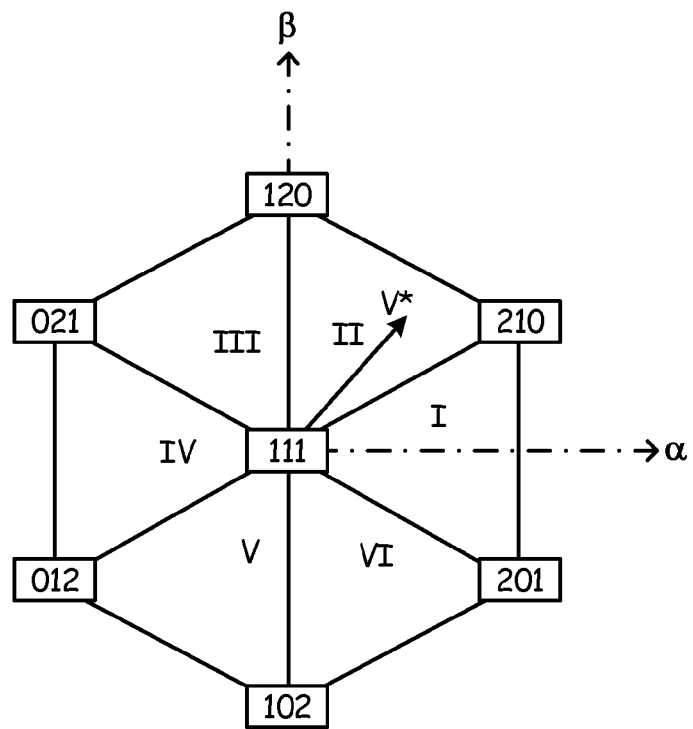
FIG. 3 is a space vector diagram illustrating only zero-common mode states available to a three-level converter according to an embodiment of the present invention.

FIG. 3 is a space vector diagram illustrating only zero-common mode states available to a three-level converter according to an embodiment of the present invention. To limit the generation of common-mode voltage at the AC terminals of the converter, those states (shown in FIG. 2) that generate common-mode voltage are removed, and only those states that do not generate a common-mode voltage component are retained. The resulting space vector diagram for preventing the generation of common-mode voltage is shown in FIG. 3. For example, state '111' connects all three AC terminals Va, Vb, and Vc to neutral DC terminal Vn. The sum of the AC terminal voltages is zero, such that the common mode voltage at the AC terminals of the converter is zero. Likewise, the other states shown in Figure similarly provide a zero common mode voltage at the AC terminals of the converter.

The seven allowable states shown in FIG. 3 result in the space vector diagram being divided into six different segments, labeled triangular regions 1-6. The location of the rotating voltage vector determines the triangular region and therefore the states utilized by controller 12. For example, in the embodiment shown in FIG. 3, voltage vector V* is located in the second triangular region, such that controller 12 utilizes switching states '111', '210', and '120', and would transition to each of the available switching states during the switching period. As described in more detail below, to center-align the plurality of PWM signals, controller 12 double-switches (i.e., turns On and Off twice) those switches associated with one of the plurality of AC terminals. Typically, a controller for a three-level converter will traverse in one direction those switching states associated with a selected triangular region during a switching period. As a result, each switch is turned On at most one time during a switching period. In an embodiment of the present invention, controller 12 traverses in a first direction those switching states associated with a selected triangular region during the first half of a switching period, and then traverses the switching states in a second, opposite, direction during the second half of the switching period. As a result, switches associated with one of the plurality of AC terminals is switched On and Off twice during the switching period, and the PWM signals will be center aligned within the switching period.

Figure 4:
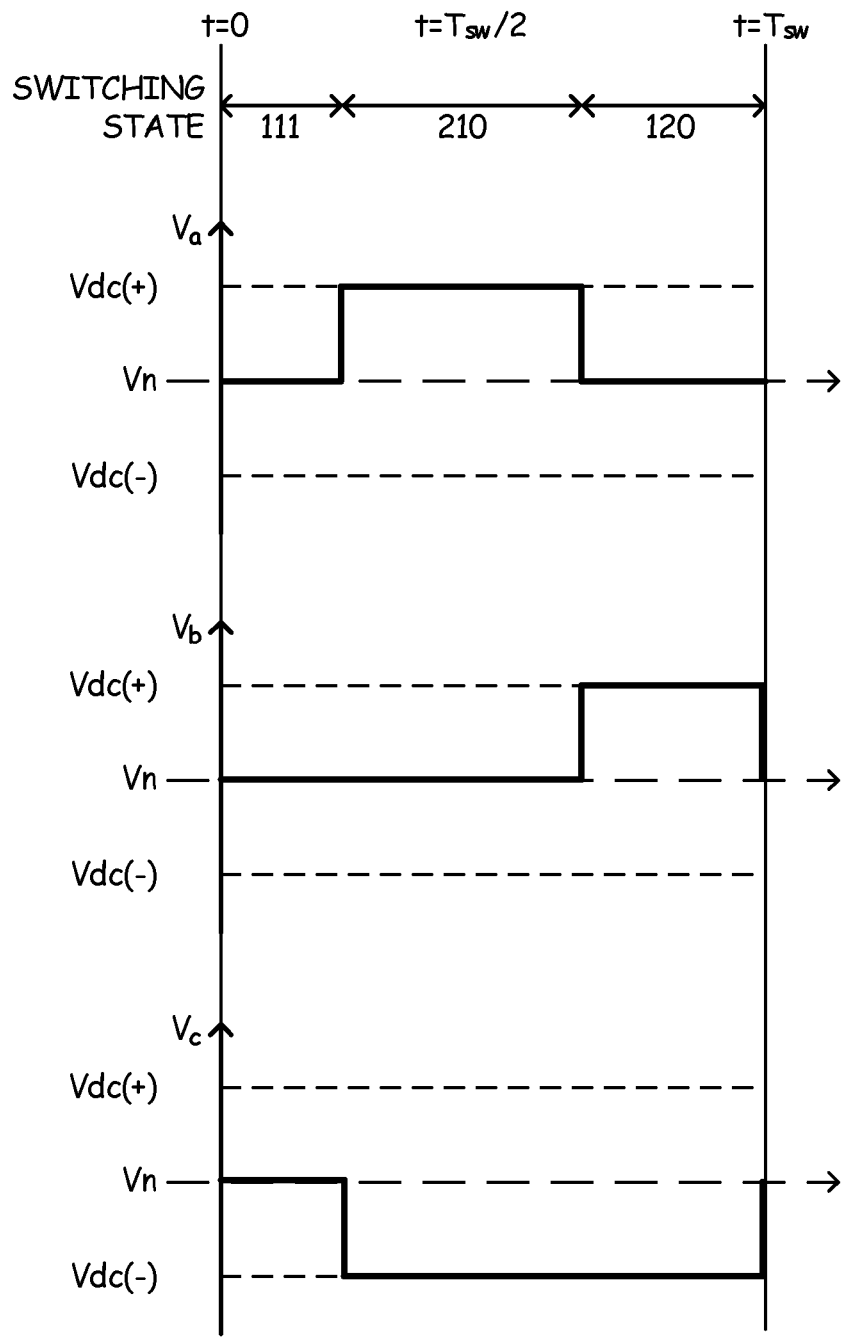
FIG. 4 is a timing diagram of common mode elimination switching sequences according to the prior art switching scheme.

FIG. 4 is a timing diagram utilized by the prior art to eliminate common-mode voltage as known in the prior art. The timing diagram illustrates a sequence associated with switch states '111', '210', and '120', illustrated by the line labeled 'V*'. During switch state '111', AC terminals Va, Vb, and Vc (illustrated below and labeled as such) are each connected to the neutral voltage Vn. Converter 10 transitions from switch state '111' to '210', wherein AC terminal Va is connected to positive DC terminal Vdc(+), AC terminal Vb is connected to neutral DC terminal Vn, and AC terminal Vc is connected to negative DC terminal Vdc(−). Converter 10 transitions from switch state '210' to '120', wherein AC terminal Va is connected to neutral DC terminal Vn, AC terminal Vb is connected to positive DC terminal Vdc(+), and AC terminal Vc remains connected to negative DC terminal Vdc (−). However, as illustrated by the voltage waveforms associated with AC terminal voltages Va, Vb, and Vc, none of the voltages are balanced or centered about the time period Tsw. In particular, AC terminal voltage Va is offset slightly to the left, AC terminal voltage Vb is offset entirely to the right, and AC terminal voltage Vc is offset entirely to the left. These imbalances result in differential mode distortion created at the AC terminals of converter 10.

Figure 5:
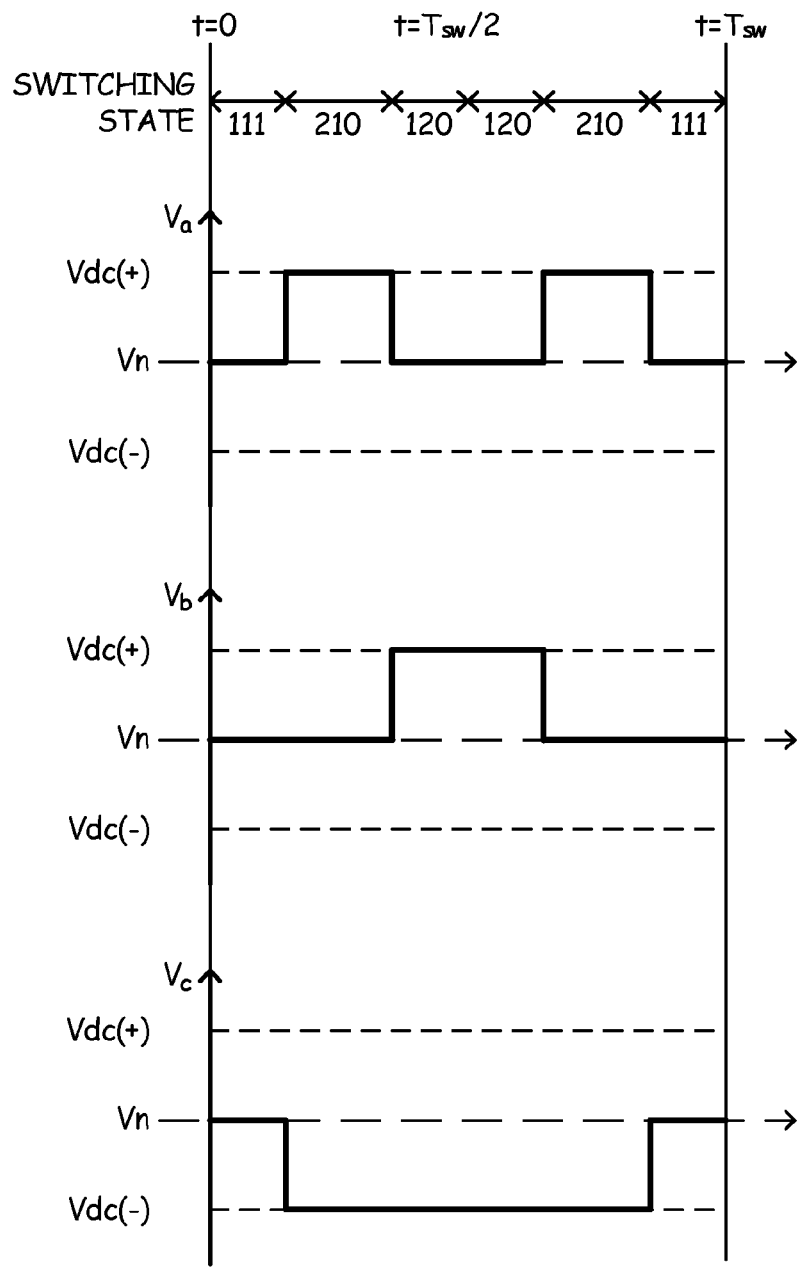
FIG. 5 is a timing diagram of center-aligned common mode elimination switching sequences according to an embodiment of the present invention.

FIG. 5 is a timing diagram of center-aligned common mode elimination switching sequences according to an embodiment of the present invention. The timing diagram shown in FIG. 5 illustrates a switching sequence associated with switch states '111', '210', and '120'. However, in contrast with the timing diagram shown in FIG. 4, the timing diagram shown in FIG. 5 centers or balances the switching pulses about the center of the switching period Tsw. In particular, rather than travel counterclockwise one time around the possible switch states (e.g., '111' to '210' to '120'), in the embodiment shown in FIG. 4, controller 12 travels counterclockwise around the possible switch states for the first half of the switching period and then clockwise around the possible switch states for the second half of the switching period. As a result, each of the switching voltage waveforms associated with AC terminals Va, Vb, and Vc are centered about the switching period. A consequence is that the semiconductors associated with one of the AC terminals is switched on and off twice with respect to the semiconductors associated with the other AC terminals. In the example shown in FIG. 5, AC terminal Va is switched On twice, once during the transition from state '111' to '210' during the first half of the switching period, and then again during the transition from state '120' to '210" during the second half of the switching period.

Depending on the triangular region in which the voltage vector is located, one of the AC terminals will be double switched during every switching period. For example, AC terminal Va is double switched in triangular regions II and V, AC terminal Vb is double switched during triangular regions I and IV, and AC terminal Vc is double switched during triangular regions III and VI. In this way, increased thermal energy created as a by-product of the increased switching frequency is spread out over each of the plurality of switches.

Figure 6:
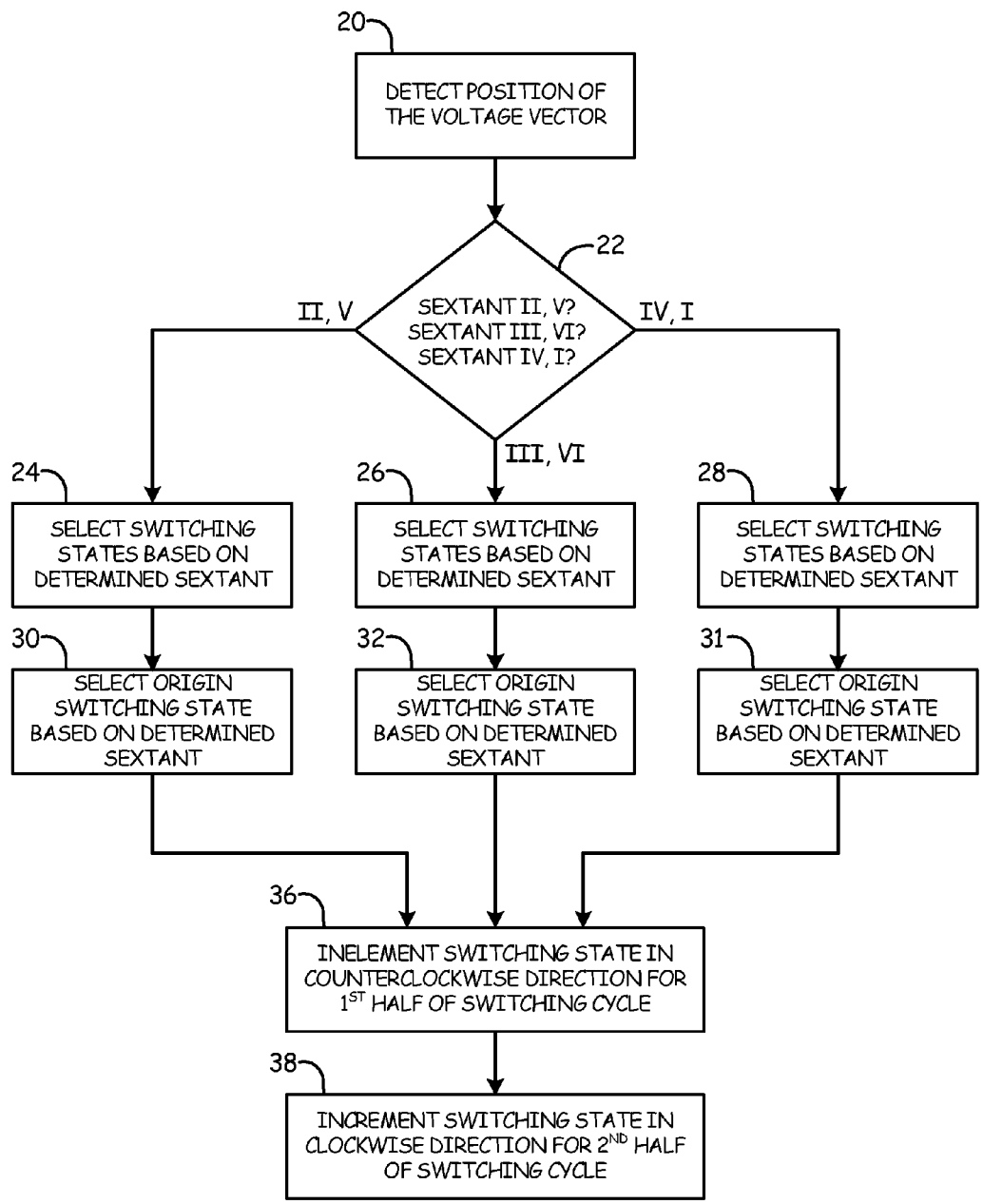
FIG. 6 is a flowchart illustrating operations performed by a three-level controller to implement the desired switching frequency according to an embodiment of the present invention.

FIG. 6 is a flowchart illustrating operations performed by controller 12 to implement the desired switching frequency. At step 20, controller 12 detects the position of the voltage vector V* in the αβ reference frame. At step 22, controller 12 determines the triangular region associated with the detected position of the voltage vector V*. Based on the determined triangular region, the method continues at step 24, 26, or 28. Step 24 is selected in response to the voltage vector V* being located in triangular regions II, V. Step 26 is selected in response to the voltage vector V* being located in triangular regions III, VI. Step 28 is selected in response to the voltage vector V* being located in triangular regions IV, I. At steps 24, 26, and 28, those switching states associated with zero common-mode voltage are selected. For example, if the voltage vector is in triangular region II, then switching states '120', '111', and '210' are selected.

At steps 30, 32, and 34, controller 12 selects the origin switching state based on the determined triangular region, wherein the origin state dictates the first switching state utilized in the switching pattern. Selection of the origin switching state dictates the AC phase and corresponding solid-state switches that will be double switched during the switching period.

At step 36, controller 12 implements the desired switching pattern for the first half of the switching period by incrementing the switching states. The term "incrementing" here means transitioning from one switching state to another in a predetermined direction (e.g., counterclockwise). At step 38, controller 12 implements the desired switching pattern for the second half of the switching period by decrementing the switching states. The term "decrementing" here means transitioning from one switching state to another in a predetermined direction opposite to the first direction (e.g., clockwise).

The following are non-exclusive descriptions of possible embodiments of the present invention.

A method of generating pulse-width modulated (PWM) command signals for a plurality of switches employed in a three-level converter to selectively conduct electricity between a plurality of alternating current terminals and at least three direct current terminals. The method includes receiving a plurality of voltage commands, selecting a triangular region based on the received voltage commands, wherein the selected triangular region is defined by at least three switching states, selecting an origin switching state from the switching states defining the selected triangular region, incrementing the switching states from the selected origin switching state during a first half of the switching period, and decrementing the switching states during a second half of the switching period until the origin switching state is reached. The switching states utilized during the switching period dictate the PWM command signals provided to the plurality of switches employed in the three-level converter.

In any of the foregoing embodiments of the method of controlling a three-level converter, the method additionally or alternatively may include incrementing the switching state to progress in a counter-clockwise direction around a triangular region that defines the selected switching states.

In any of the foregoing embodiments of the method of controlling a three-level converter, the method additionally or alternatively may include decrementing the switching state to progress in a clockwise direction around the triangular region.

In any of the foregoing embodiments of the method of controlling a three-level converter, the method additionally or alternatively may include selecting the origin switching state based on the selected triangular region to ensure solid-state switches associated with one of the plurality of AC terminals are not double switched in adjacent triangular regions.

In any of the foregoing embodiments of the method of controlling a three-level converter, the method additionally or alternatively may include wherein a switching frequency of solid-state switches associated with one of the plurality of AC terminals is switching at twice the frequency of solid-state switches associated with the remaining plurality of AC terminals.

A multi-level converter includes a plurality of alternating current (AC) terminals connected to an AC load or source, at least three direct current (DC) terminals connected to a DC source or load, and a plurality of solid-state switches that are selectively turned On and Off to connect each of the plurality of AC terminals to one of the three DC terminals. The converter receives voltage commands and in response generates pulse-width modulation (PWM) control signals for provision to the plurality of solid-state switches to selectively control the On/Off state of the solid-state switches. The controller organizes the various switching configurations of the solid-state switches into switching states that define a plurality of triangular regions. The controller selects one of the plurality of triangular regions based on the monitored AC voltage commands and selects an origin switching state within the triangular region, wherein the controller increments the switching state in a first direction around the triangular region during a first half-cycle of a switching period and decrements the switching state in a second direction around the triangular region during a second half-cycle of the switching period.

In any of the foregoing embodiments of the three-level converter, the controller may select an origin state from the plurality of switching states associated with the triangular region to determine those solid-state switches associated with one of the plurality of AC terminals to be switched at twice the frequency of solid-state switches associated with the remaining plurality of AC terminals.

In any of the foregoing embodiments of the three-level converter, the controller may ensure that in different triangular regions different groups of solid-state state switches are switched at twice the switching frequency of the remaining plurality of solid-state switches.

In any of the foregoing embodiments of the three-level converter, the controller may ensure that each of the PWM control signals generated by the controller are centered about a midpoint of the switching period.

A multi-level converter that switches a plurality of alternating current (AC) terminals into electrical continuity with a plurality of direct current (DC) terminals includes a first set of solid-state switches connected between a first AC terminal and the plurality of DC terminals, a second set of solid-state switches connected between a second AC terminal and the plurality of DC terminals, and a third set of solid-state switches connected between a third AC terminal and the plurality of DC terminals. The multi-level converter also includes a controller connected to provide pulse-width modulated (PWM) signals to the first, second, and third sets of solid-state switches to selectively connect the first, second, and third AC terminals to one of the plurality of DC terminals. The controller utilizes a space vector diagram comprised of a plurality of triangular regions each defined by three switching states, wherein the controller selects one of the plurality of triangular regions based on desired output voltages and generates the PWM signals by traversing in a first direction the switching states in a first half-cycle of the switching period and traversing in a second direction the switching states in a second half-cycle of the switching period.

In any of the foregoing embodiments of the three-level converter, the first set of solid-state switches may be switched at a frequency twice that of the other set of solid-state switches when utilizing the first or fourth sextant, the second set of solid-state switches may be switched at a frequency twice that of the other set of solid-state switches when utilizing the second or fifth sextant, and the third set of solid-state switches may be switched at a frequency twice that of the other set of solid-state switches when utilizing the third or sixth sextant.

In any of the foregoing embodiments of the three-level converter, the controller may determine the set of solid-state switches to be switched at twice the frequency of the other sets of solid-state switches by selecting an origin state to begin the first half-cycle of the switching period and end the second half-cycle of the switching period.

In any of the foregoing embodiments of the three-level converter, each of the plurality of switching states defining the plurality of triangular regions may be zero common-mode switching states that provide no net common mode voltage to the AC terminals of the power converter.

In any of the foregoing embodiments of the three-level converter, the first direction traversed may be a counterclockwise direction.

In any of the foregoing embodiments of the three-level converter, the second direction traversed may be a clockwise direction.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of generating pulse-width modulated (PWM) command signals for a plurality of switches employed in a converter to selectively conduct electricity between a plurality of alternating current (AC) terminals and at least three direct current (DC) terminals, the method comprising:
   receiving the plurality of voltage commands;
   selecting a triangular region based on the received voltage commands, wherein the selected triangular region is defined by at least three switching states;
   selecting an origin switching state from the switching states defining the selected triangular region;
   incrementing the switching states from the selected origin switching state during a first half of the switching period; and
   decrementing the switching states during a second half of the switching period until the origin switching state is reached, wherein the switching states utilized during the switching period dictate the PWM command signals provided to the plurality of switches employed in the three-level converter.

2. The method of claim 1, wherein incrementing the switching state results in switching states progressing in a counter-clockwise direction around a triangular region that defines the selected switching states.

3. The method of claim 2, wherein decrementing the switching state results in switching states progressing in a clockwise direction around the triangular region.

4. The method of claim 1, wherein the origin switching state is selected based on the selected triangular region to ensure solid-state switches associated with one of the plurality of AC terminals are not double switched in adjacent triangular regions.

5. The method of claim 1, wherein a switching frequency of solid-state switches associated with one of the plurality of AC terminals is twice the frequency of solid-state switches associated with the remaining plurality of AC terminals.

6. A multi-level converter comprising:
   a plurality of alternating current (AC) terminals connected to a three-phase AC source or load;
   at least three direct current (DC) terminals connected to a multi-level DC source or load;
   a plurality of solid-state switches that are selectively turned On and Off to connect each phase of the AC terminal to one of the plurality of DC terminals;
   a controller that receives voltage command signals and in response generates pulse-width modulation (PWM) control signals for provision to the plurality of solid-state switches to selectively control the On/Off state of the solid-state switches, wherein various switching configurations of the solid-state switches are organized by the controller into switching states that define a plurality of triangular regions, wherein the controller selects one of the plurality of triangular regions based on the voltage command signals and selects an origin switching state within the triangular region, wherein the controller increments the switching state in a first direction around the triangular regions during a first half-cycle of a switching period and decrements the switching state in a second direction around the triangular regions during a second half-cycle of the switching period, wherein the switching states utilized during the switching period dictate the PWM control signals provided to the plurality of switches employed in the three-level converter.

7. The multi-level converter of claim 6, wherein selecting the origin state selects solid-state switches associated with one of the plurality of AC terminals to be switched at twice the frequency of solid-state switches associated with the remaining plurality of AC terminals.

8. The multi-level converter of claim 6, wherein the controller ensures that in different triangular regions different groups of solid-state state switches are switched at twice a switching frequency of the remaining plurality of solid-state switches.

9. The multi-level converter of claim 6, wherein each of the PWM control signals is centered about a midpoint of the switching period.

10. A multi-level converter for switching a plurality of alternating current (AC) terminals into electrical continuity with a plurality of direct current (DC) terminals, the multi-level converter comprising:
 a first set of solid-state switches connected between a first AC terminal and the plurality of DC terminals;
 a second set of solid-state switches connected between a second AC terminal and the plurality of DC terminals;
 a third set of solid-state switches connected between a third AC terminal and the plurality of DC terminals;
 a controller connected to provide pulse-width modulated (PWM) signals to the first, second, and third sets of solid-state switches to selectively connect the first, second, and third AC terminals to one of the plurality of DC terminals, wherein the controller utilizes a space vector diagram comprised of a plurality of triangular regions each defined by three switching states, wherein the controller selects one of the plurality of triangular regions based on desired terminal voltages and generates the PWM signals by traversing in a first direction the switching states in a first half-cycle of the switching period and traversing in a second direction the switching states in a second half-cycle of the switching period.

11. The multi-level converter of claim 10, wherein the first set of solid-state switches are switched at a frequency twice that of the other set of solid-state switches when utilizing the first or fourth sextant, the second set of solid-state switches are switched at a frequency twice that of the other set of solid-state switches when utilizing the second or fifth sextant, and the third set of solid-state switches are switched at a frequency twice that of the other set of solid-state switches when utilizing the third or sixth sextant.

12. The multi-level converter of claim 11, wherein the controller determines the set of solid-state switches to be switched at twice the frequency of the other sets of solid-state switches by selecting an origin state to begin the first half-cycle of the switching period and end the second half-cycle of the switching period.

13. The multi-level converter of claim 10, wherein each of the plurality of switching states defining the plurality of triangular regions are zero common-mode switching states that provide no net common mode voltage at the AC terminals of the power converter.

14. The multi-level converter of claim 10, wherein the first direction is a counterclockwise direction.

15. The multi-level converter of claim 14, wherein the second direction is a clockwise direction.

* * * * *